Oct. 25, 1949.  F. T. BLANKENSHIP  2,485,546
TAIL GATE FOR VEHICLES
Filed July 17, 1948  2 Sheets-Sheet 1
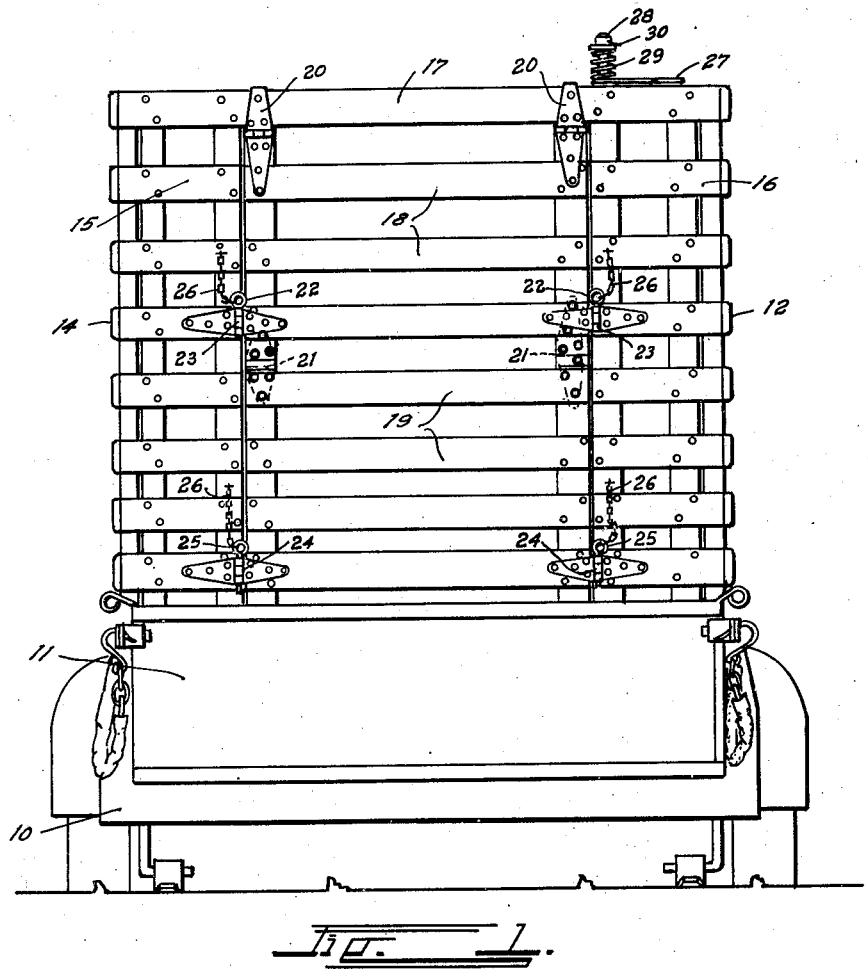
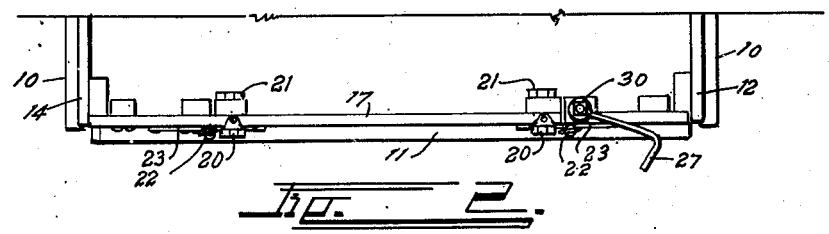
INVENTOR.
FLOYD T. BLANKENSHIP
BY
ATTORNEY.

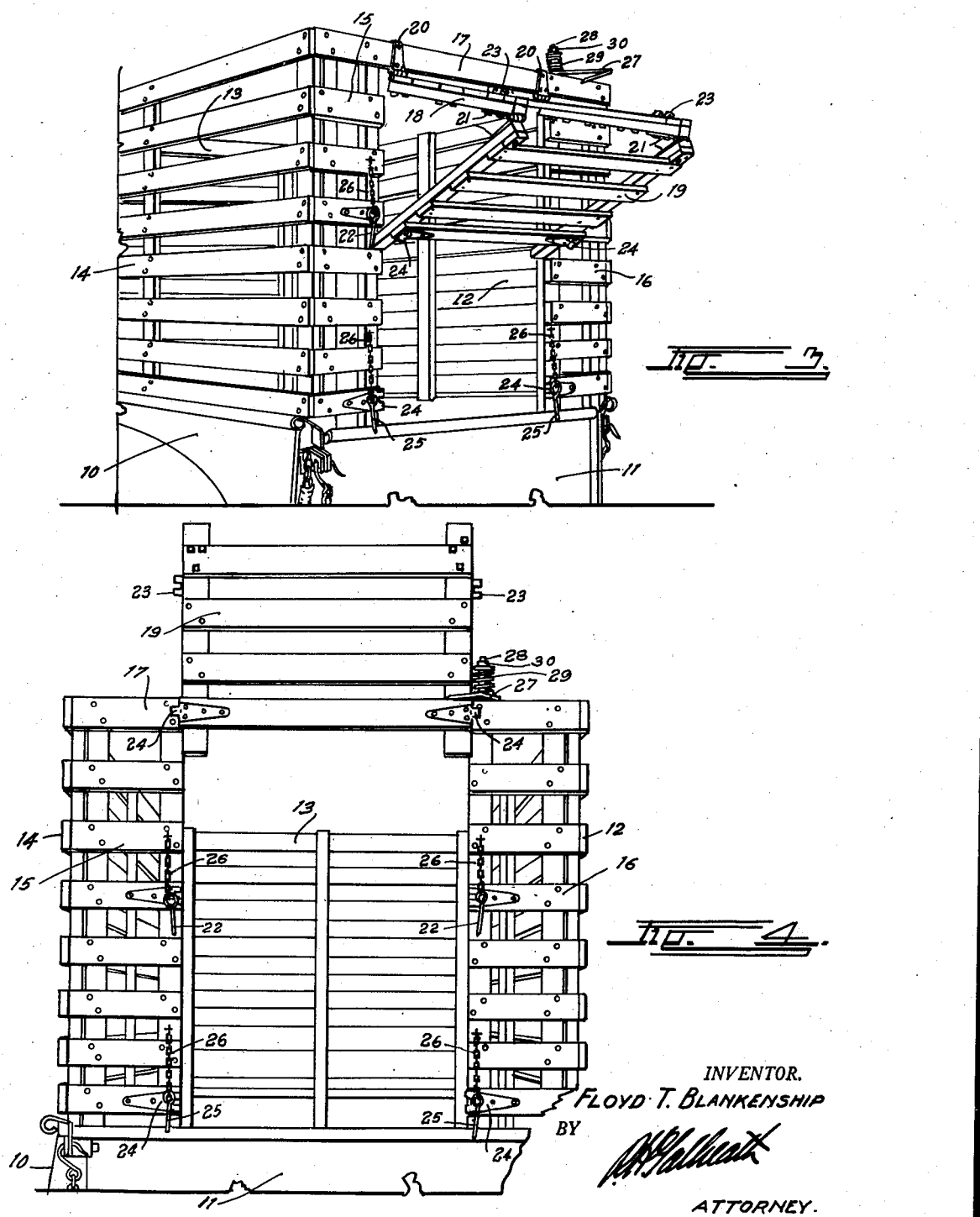

Patented Oct. 25, 1949

2,485,546

UNITED STATES PATENT OFFICE 2,485,546

TAIL GATE FOR VEHICLES

Floyd T. Blankenship, Lakewood, Colo.

Application July 17, 1948, Serial No. 39,265

1 Claim. (Cl. 296—51)

This invention relates to a cattle rack or body for use in hauling livestock in a truck and more particularly to a tail gate for automotive bodies of the cattle rack type. The principal object of the invention is to provide a highly efficient tail gate for a cattle rack body which can be opened partially upward from the bottom for the use of small animals such as sheep and swine or which can be opened fully upward for loading and unloading large animals and which when closed will be secure against accidental opening.

Another object of the invention is to provide an end gate for cattle rack bodies which can be placed inside the tail gate of a standard truck and which can be opened when desired without opening the truck tail gate.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a rear view of a conventional truck body with the improved cattle rack in place therein;

Fig. 2 is a plan view of the rear portion of the rack of Fig. 1;

Fig. 3 is a perspective view illustrating the improved end gate partially open; and Fig. 4 is a rear view illustrating the end gate fully opened.

In the drawing, a conventional truck body is illustrated at 10 with its conventional tail gate at 11.

The improved cattle rack consists of four open frames joined together at their ends to form a complete rectangular enclosure. The four frames are of the usual rack construction with vertically separated horizontal boards secured to upright posts. The frames are indicated on the drawing as follows: front frame 13, left side frame 14, right side frame 12. The back frame consists of two back portions, a left back portion 15 and a right back portion 16. The two back portions 15 and 16 are joined at the top in separated relation by means of a cross beam 17.

The improved end gate is formed in open, rack-like sections, an upper section 18 and a lower section 19. The upper section 18 is hingedly suspended from the cross beam 17 upon a pair of outside upper hinges 20. The lower section 19 is swingingly suspended from the upper section 18 upon an inner pair of hinges 21.

Thus, it can be seen that the upper section 18 can swing rearwardly and upwardly and the lower section 19 can swing inwardly and upwardly between the two back portions 15 and 16. When the end gate is fully closed, as shown in Fig. 1, it can be locked in the closed position by means of a pair of upper locking pins 22 which pass through and interlock a pair of upper fastening devices 23, and a pair of lower locking pins 25 and lower fastening devices 24.

The fastening devices illustrated consist of ordinary strap hinges with the hinge pins removed and replaced by the locking pins 22 and 25. One strap of each hinge is secured to the end gate and the other strap of each hinge is secured to one of the end portions 15 or 16. The pins 22 and 25 are provided with anchoring chains 26 so that they will always be there when you want them.

When the end gate is completely closed the lower extremity thereof extends downwardly in front of the tail gate 11 to still further prevent it from being forced rearwardly. It will be noted that the end gate may be opened without opening the tail gate 11 by simply releasing the pins 22 and 25, and swinging the mid-portion thereof rearwardly.

The gate can be partially opened by lifting and swinging the lower gate section to one side and resting it upon any of the horizontal members in any of the back sections 15 and 16, as shown in Fig. 3 when fully opened, the two sections 18 and 19 will lie vertically parallel above the cross beam 17 as shown in Fig. 4. They may be locked in this vertical position by means of a locking hook 27 rotatably mounted on a hook post 28 which projects upward from the portion 16. A spring 29 is compressed between a nut and washer 30 on the post 28 on the top of the hook to prevent the latter from swinging and rattling during transportation.

The entire gate may be swung rearwardly as an aligned unit, if desired, by dropping the tail gate 11 and pulling the bottom of the end gate rearwardly.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A cattle rack for vehicles comprising: two side frames; a front frame; a cross beam extending between the upper rearward extremities of the side frames; an upper gate section; a first pair of hinges suspending said upper gate section from said cross beam; a lower gate section; a second pair of hinges suspending said lower gate section from said upper gate section, said first pair of hinges allowing said upper gate section to swing outwardly and said second pair of hinges allowing said lower gate section to swing inwardly; upright posts at each side of said gate sections; and a plurality of vertically spaced members secured to said posts at each side of said gate sections upon which the lower edge of said lower gate section may be rested to support it at any desired height.

FLOYD T. BLANKENSHIP.

REFERENCES CITED

The following references are of record in the file of this patent:

UNITED STATES PATENTS

| Number | Name | Date |
|---|---|---|
| 1,884,334 | Standish | Oct. 25, 1932 |
| 2,057,555 | Clark et al. | Oct. 13, 1936 |
| 2,113,291 | Clark et al. | Apr. 5, 1938 |
| 2,334,749 | Burr | Nov. 23, 1943 |